June 20, 1961 B. M. GORDON ET AL 2,989,741

INFORMATION TRANSLATING APPARATUS AND METHOD

Filed July 22, 1955

5 Sheets-Sheet 1

INVENTORS.
BERNARD M. GORDON
ROBERT P. TALAMBIRAS
BY Jacob Trachtman
ATTORNEY.

INVENTORS.
BERNARD M. GORDON
ROBERT P. TALAMBIRAS
BY Jacob Trachtman
ATTORNEY.

INFORMATION TRANSLATING APPARATUS AND METHOD

Filed July 22, 1955 5 Sheets-Sheet 3

INVENTORS.
BERNARD M. GORDON
ROBERT P. TALAMBIRAS
BY Jacob Trachtman
ATTORNEY.

INFORMATION TRANSLATING APPARATUS AND METHOD

Filed July 22, 1955

5 Sheets-Sheet 4

INVENTORS.
BERNARD M. GORDON
ROBERT P. TALAMBIRAS
BY Jacob Trachtman
ATTORNEY.

INFORMATION TRANSLATING APPARATUS AND METHOD

Filed July 22, 1955 5 Sheets-Sheet 5

INVENTORS.
BERNARD M. GORDON
ROBERT P. TALAMBIRAS
BY Jacob Trachtman
ATTORNEY.

2,989,741
INFORMATION TRANSLATING APPARATUS AND METHOD

Bernard M. Gordon, Concord, and Robert P. Talambiras, Cambridge, Mass., assignors to Epsco, Incorporated, Boston, Mass., a corporation of Massachusetts Filed July 22, 1955, Ser. No. 523,798
5 Claims. (Cl. 340—347)

Figure 1:
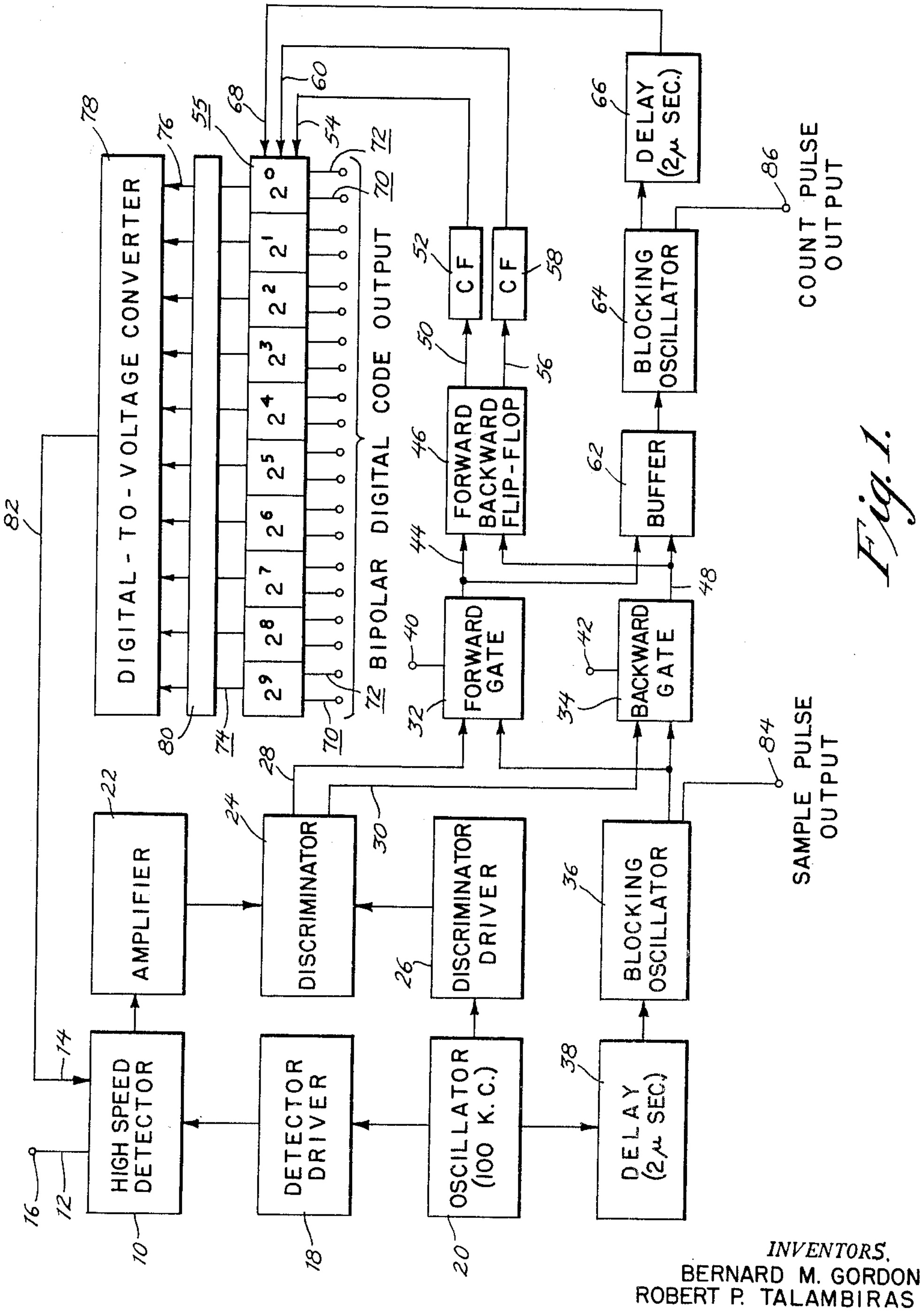

This invention relates to information translating apparatus and method, and more porticularly to apparatus and method for translating analogue information to coded information and reversely translating information from analogue form to coded form.

With the development of high speed digital and analogue computing devices, the need has arisen for high speed translating devices for converting information from analogue to digital form and reversely from digital form to analogue form. Such apparatus allows the operation in one system of devices using information in various forms by allowing their linkage. In order to preserve the advantages of the modern computers, such apparatus must be able to rapidly and continuously convert information presented to it.

It is therefore a principal object of this invention to provide new and improved apparatus and method for translating information from one form to another form.

Another object of the invention provides new and improved apparatus and method for rapidly translating information from one form to another form.

Still another object of the invention is to provide new and improved apparatus and method for rapidly translating continuously variable information, and making the information in its translated form continuously available.

Still a further object of the invention is to provide new and improved apparatus for translating information in analogue form to digital form, and which is adjustable for receiving information in digital form for translation to analogue form.

Yet a further object of the invention is to provide new and improved apparatus for translating information from analogue form to digital form which may readily be designed for the degree of accuracy required.

Another object of the invention is to provide a new and improved apparatus and method for translating continuously varying information from analogue form to digital form which in its operation utilizes the information just previously translated to increase its efficiency.

Still another object of the invention is to provide apparatus and method which continuously provides digital information signals which are periodically corrected for conformance with a received variable analogue information signal.

Yet another object of the invention is to provide new and improved translating apparatus for sampling a varying analogue signal at a high rate and correcting stored digital information to conform with the sampled analogue information.

Still a further object of the invention is to provide apparatus and method for obtaining the highest or lowest value attained by a continuously varying information signal over a period of time.

Yet a further object of the invention is to provide new and improved apparatus and method for obtaining in digital form the highest or lowest value attained by a continuously varying analogue signal over a given period of time.

Another object of the invention is to provide new and improved apparatus which may be set to either translate analogue information to digital information, to continuously provide a digital signal corresponding to the highest value attained by the varying analogue signal, or to provide a digital output signal corresponding to the lowest value achieved by a varying analogue signal.

Still another object of the invention is to provide a new and improved translating device which is highly versatile especially when used in systems utilizing information in analogue and digital form, which is highly efficient, reliable and accurate in operation, and is comparatively inexpensive to manufacture, operate and maintain.

The above objects as well as many other objects are achieved by providing an information translating apparatus having a reversible binary counting device with an input lead, forward and backward control leads, and a plurality of information output leads. A digital voltage converter receives the information from the output leads of the counting device and produces an output analogue signal corresponding with the count of the counting device.

A high speed detector receives the external variable analogue or voltage signal to be translated as well as the voltage produced by the digital to voltage converter. The detector is periodically energized to deliver an output signal. The output signal of the detector has the effect of increasing or decreasing the count of the reversible counting device for correspondence with the external analogue information signal.

A control unit selectively allows the reversible binary counter to only increase or to only decrease its count to respectively correspond with the high or low values attained by the analogue signal received. In this manner the apparatus may be adjusted for determining either the highest or the lowest value attained by the varying information input analogue signal over a given period of time.

The method of translating information from a first form to a second form which is carried out in the apparatus of the invention comprises storing information in digital form, converting the stored information to analogue form, and periodically comparing the converted information with the analogue information being translated, while periodically altering the stored information to correspond with the analogue information.

Figure 2:
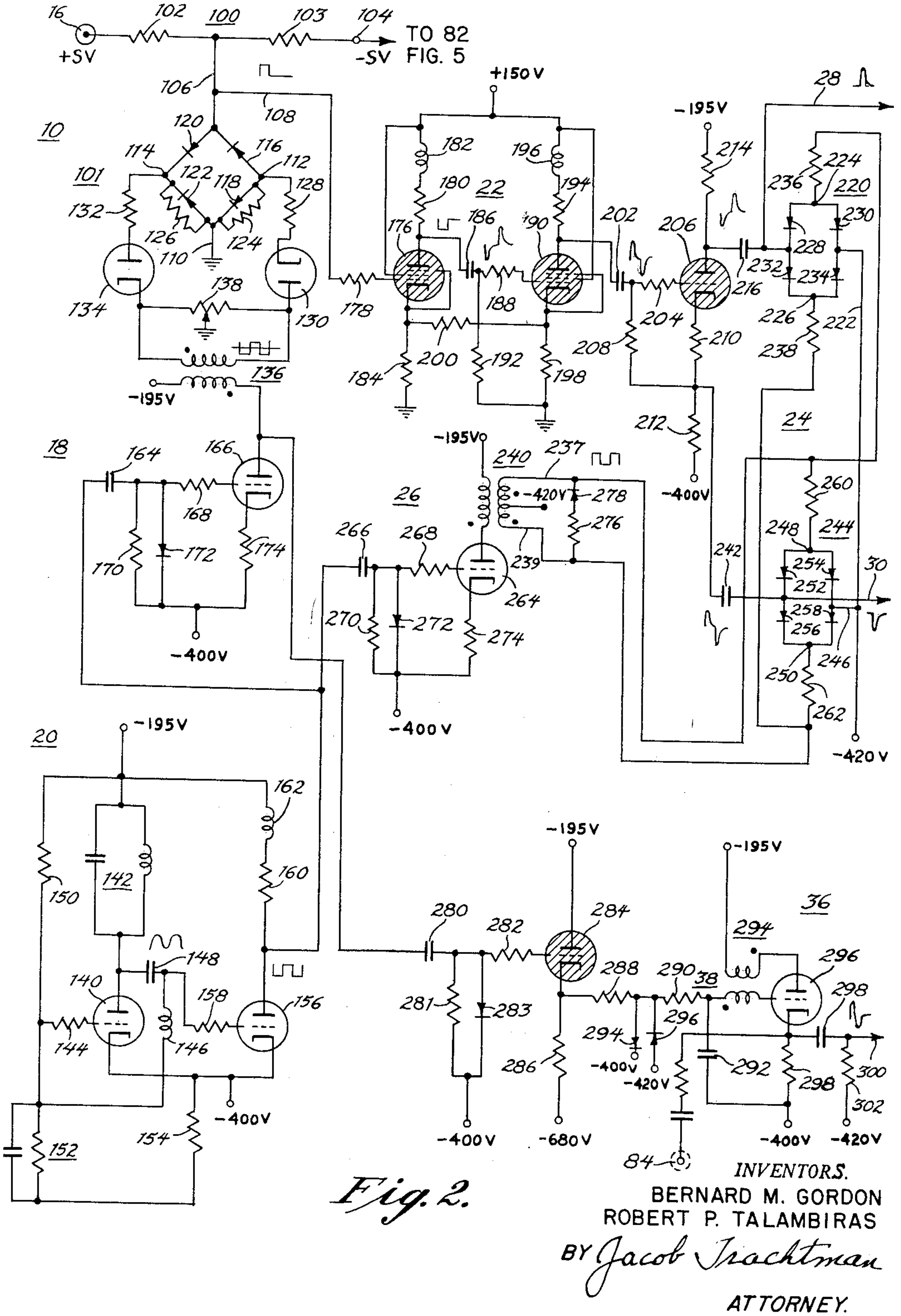
Figure 3:
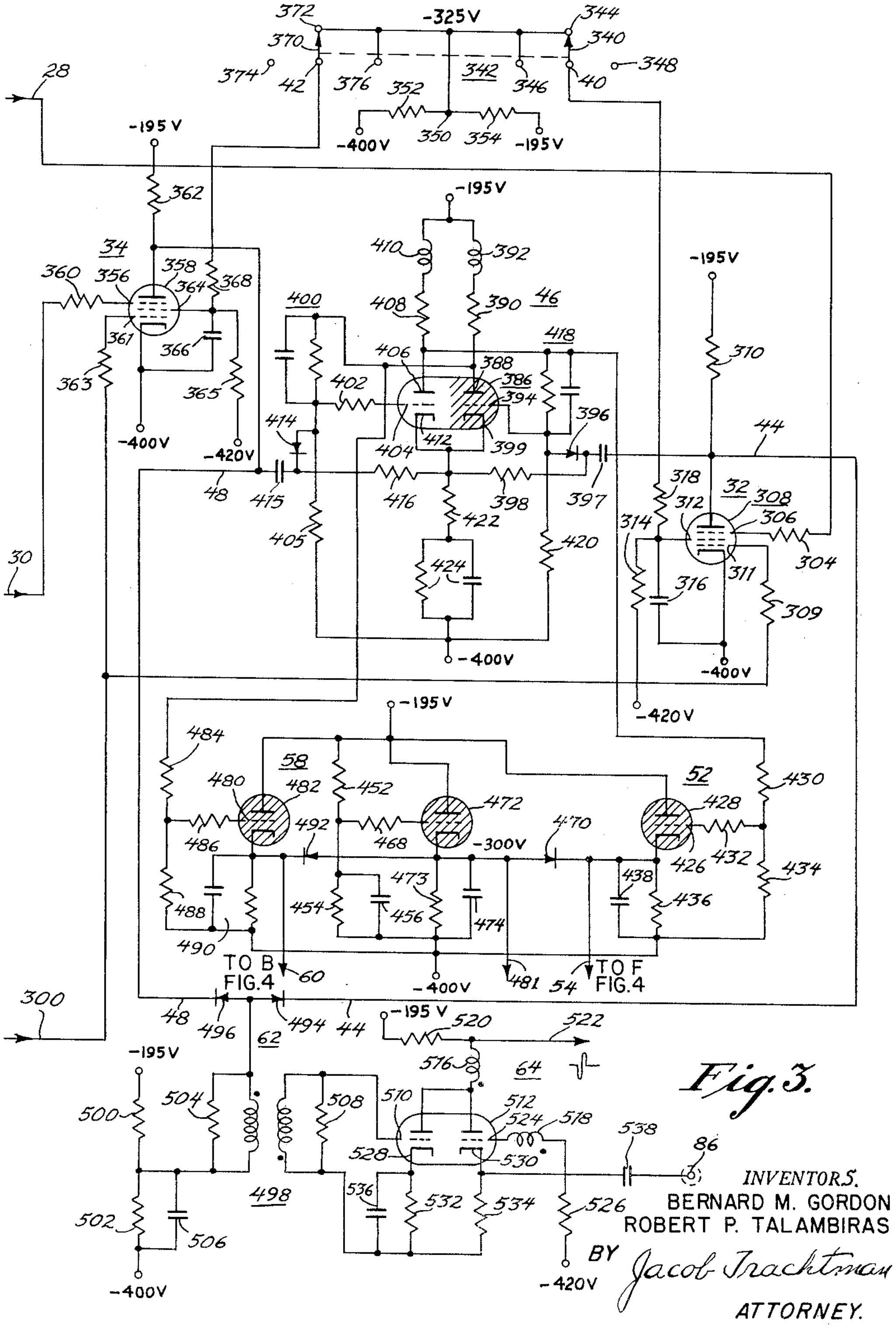
Figure 4:
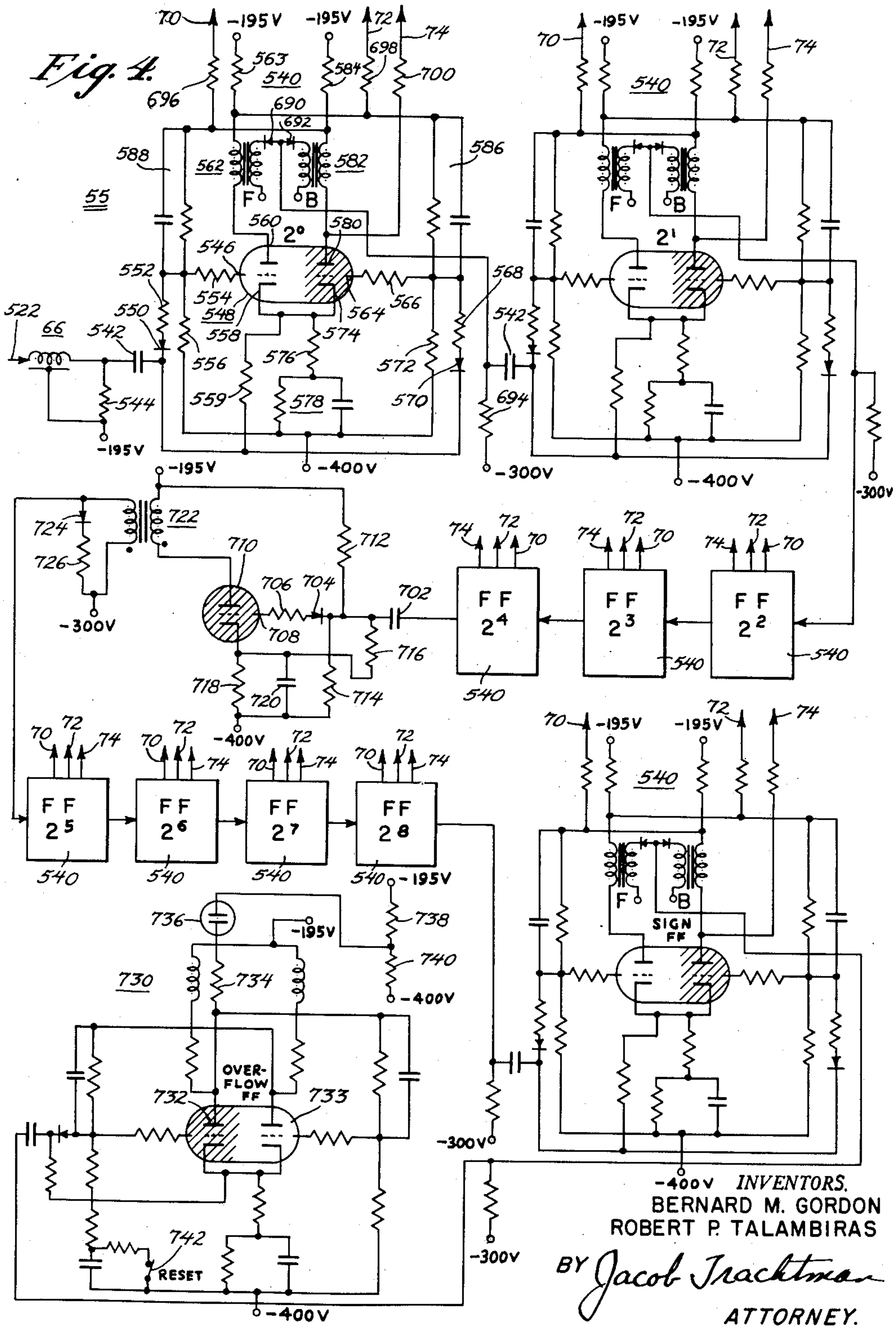
Figure 5:
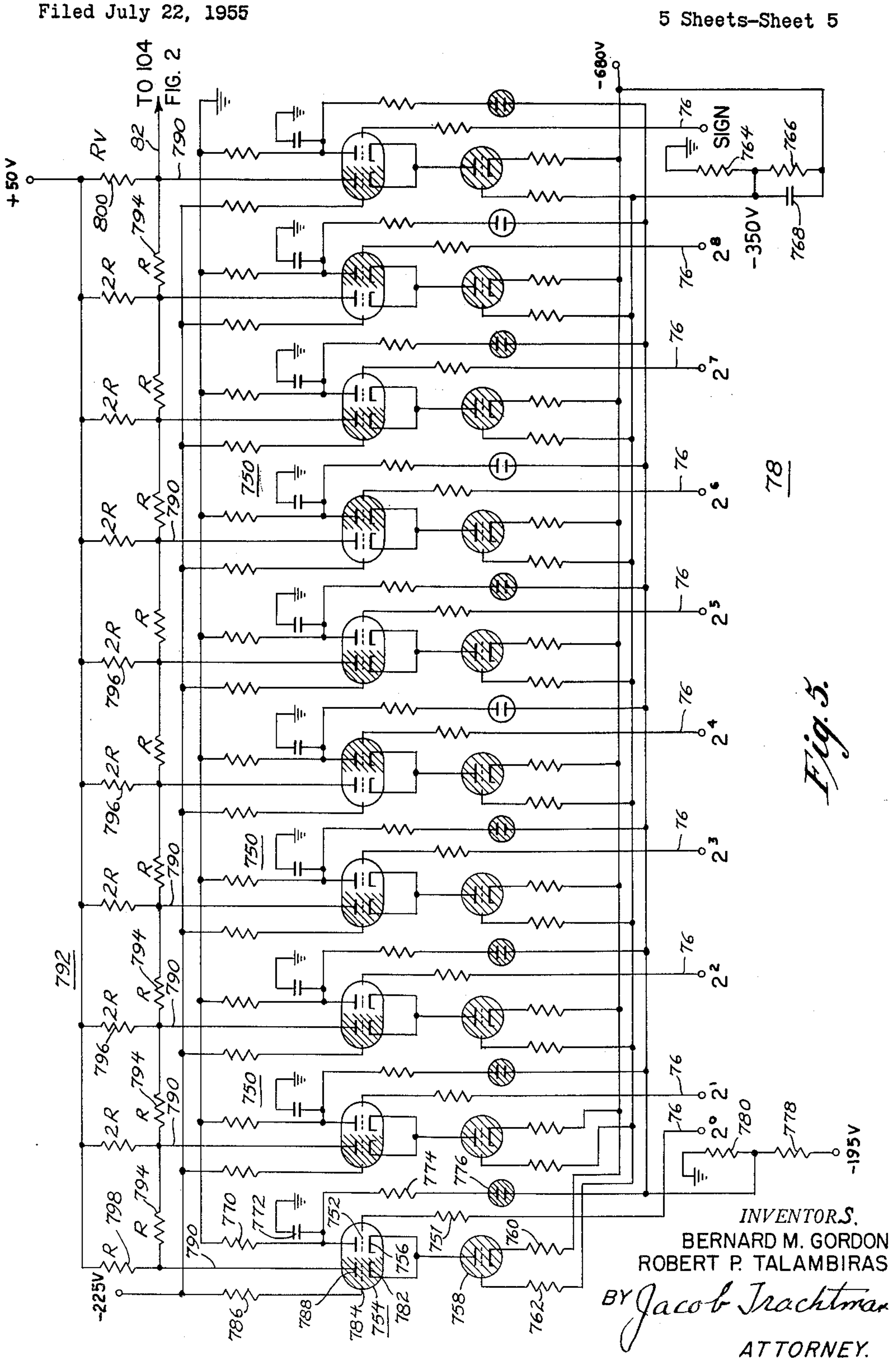

The above and other objects and aspects of the invention will become more apparent when the following detailed description is read in conjunction with the drawings, in which:

FIGURE 1 is a block diagram illustrating an information translating apparatus embodying the invention, FIGURE 2 illustrates in schematic form the detecting and discriminating circuits of FIGURE 1, FIGURE 3 illustrates in schematic form the control circuits shown in FIGURE 1, FIGURE 4 illustrates in schematic and block form the reversible counting device illustrated in FIGURE 1, and FIGURE 5 illustrates in schematic form the digital to voltage converter of FIGURE 1.

In the annexed drawings, like parts are identified by like reference characters and values of potential are given only for the purposes of illustration and not to limit the scope of the invention.

*General description*

Referring to FIGURE 1 which illustrates the information storing apparatus in block form, a high speed detector 10 is provided with first and second information input leads 12 and 14. The input lead 12 of detector 10 is adapted to receive information in analogue form from a terminal 16. The externally derived information may be continuously varying and may have the form of a voltage signal. The external signal may, however, also have other aspects including current and impedance forms.

The signals delivered to the signal input terminal 14 of the detector 10 are derived internally and are also in analogue form. The signals delivered to terminal 14 may also have voltage, current, or impedance aspects.

The high speed detector 10 is periodically energized by a detector driver 18 which is excited by an oscillator 20 which may have a frequency of 100 kilocycles.

When the high speed detector 10 is energized, it produces an output signal corresponding to the relationship of the signals delivered respectively to the input leads 12 and 14. This output signal is delivered through an amplifier 22 to a discriminator 24. The discriminator 24 is energized by a discriminator driver 26 which is also stimulated by the oscillator 20.

The discriminator 24 delivers a control signal over its first output line 28 when the signal received is above the predetermined value, and delivers a control signal over its second output line 30 when this signal is below the predetermined value.

The output line 28 delivers its signal to the first input terminal of a forward gate 32, while the other output line 30 of the discriminator 24 delivers its signal to the first input terminal of a backward gate 34.

The second input terminals of the forward and backward gates 32, 34, are energized by the output signal from a blocking oscillator 36. The blocking oscillator 36 is stimulated by the oscillator 20 through a delay element 38. By this means the blocking oscillator 36 in effect delivers a timing signal to the forward and backward gates 32, 34.

The forward and backward gates 32, 34 are each provided with a control terminal 40, 42 for respectively conditioning the delivery of signals therethrough.

Assuming that permissive signals are delivered to the control terminals 40, 42, the concurrence of signals at both input terminals of the forward gate allows the delivery of a signal to the output line 44, while the concurrence of input signals to the backward gate 34 results in the delivery of an output signal over the line 48.

A forward backward flip-flop 46 has its first and second input terminals respectively energized by the output lines 44 and 48. When the output line 44 is energized, the flip-flop 46 assumes a state delivering a signal over its output line 50 through a cathode follower 52 to the forward control line 54 of a storage or reversible binary counting device 55. When a signal is delivered to the flip-flop 46 by the line 48, it assumes its other stable state, delivering an output signal to its line 56. This signal is delivered through a cathode follower 58 to the backward control line 60 of the counter 55.

The signals appearing on the gate output lines 44 and 48 are delivered through a buffer 62 to the input of a blocking oscillator 64. If the signal delivered to the blocking oscillator 64 is greater than a predetermined minimum threshold value, it delivers an output signal through a delay element 66 to the input count line 68 of the counting device 55. This is explained in greater detail hereinafter under the heading Blocking Oscillator. The delay element 66 assures sufficient time for the counting device 55 to assume its forward or backward state before the count signal is delivered to it.

The binary counting device 55 is of the reversible type controlled by the input lines 54, 60 and increases or decreases its stored count when an input signal is delivered to its input line 68 in accordance with the control signals received. The count information stored in the counting device 55 is available in bipolar digital code over the respective sets of output leads 70 and 72.

The information output signal of the binary counting device 55 is also delivered over a plurality of output lines 74 to a corresponding series of input leads 76 of a digital-to-voltage converter 78 by a connecting plug 80. The digital-to-voltage converter 78 produces at its output lead 82, a signal which has an amplitude related to the count of the binary counting device 55. The amplitude signal on line 82 is delivered to the second input line 14 of the high speed detector 10. Thus the information stored in digital form by the counting device 55 is converted to a corresponding analogue form and is delivered to the high speed detector 10 for comparison with the external analogue signal received by its input line 12.

*Operation*

The information translating apparatus is also provided with a sample pulse output terminal 84 and a count pulse output terminal 86 delivering signals which may be useful in operating and coordinating other related and auxiliary equipment.

In the operation of the information translating apparatus, the high speed detector 10 compares the external analogue signal received over its first input line 12 with the internally derived analogue signal delivered over second input line 14. When the detector 10 is periodically energized by the detector driver 18, it delivers an output signal to the amplifier. This signal is determined by the relationship of the compared signals. When the external and internally derived signals are in a predetermined balanced relationship, the detector 10 does not deliver a signal to the amplifier 22. When the signal over line 14 under balances the external signal received on line 12 of the high speed detector 10, the detector 10 delivers an output signal, to the discriminator 24 through the amplifier 22 characterized by this underbalanced relationship. If the signal on line 14 overbalances the signal of line 12 of the detector 10, the detector delivers an output signal to the discriminator 24 which is characterized by the overbalanced relationship.

Upon receipt of a signal indicating underbalance, the discriminator 24 when energized by the discriminator driver 26, produces an output signal on its line 28 and when it receives a signal indicating overbalance the discriminator 24 produces an output signal on its line 30 upon energization by the driver 26.

The output lines 28 and 30 of the discriminator 24 respectively energize the first input terminals of the forward and the backward gates 32 and 34. Thus under conditions of underbalance, the forward gate 32 delivers an output signal to its line 44 when it receives a timing signal from the blocking oscillator, while under conditions of overbalance the backward gate 34 delivers an output signal over its output line 48.

The delivery of an output signal to the flip-flop 46 from the forward gate 32 sets it in its forward state energizing its output line 50 which in turn delivers a signal to the binary counting device 55 over the forward control line 54. This sets the binary counting device 55 for counting in the forward direction. On the other hand, the delivery of an output signal from the backward gate 34 sets the flip-flop 46 to its backward state which results in the energization of its output lead 56. The signal from the output lead 56 energizes the backward control line 60 which conditions the binary counting device 55 for counting in the reverse or backward direction.

Output signals from either the forward gate 32 or the backward gate 34 energize the blocking oscillator 64 through the buffer 62. In order to stimulate the blocking oscillator 64 the amplitude of the signal delivered thereto must be sufficient to represent an unbalance of at least one count or possibly a predetermined fraction thereof for the purpose of adding stability to the apparatus. If the unbalance is sufficient for correction, the blocking oscillator passes a signal through a delay element 66 to the forward count line 68 of the binary counting device 55. The delay element provides a sufficient time delay for the counting device 55 to assume its required forward or backward counting state.

Thus under conditions of underbalance, the counting device 55 is set to its forward direction and if the underbalance is sufficient a signal is delivered to the counting device 55 to increase its count by one unit count. The increased count of the binary counting device 55 causes the converter 78 to deliver a corresponding output signal to the input line 14 of the high speed detector 10 which tends to balance the external input signal 12. In this way the count of the counting device 55 increases by one unit count each time the detector 10 is energized until the underbalance of the analogue signal on the input terminal 14 is reduced to a state of balance with respect to the external signal received over the input terminal 16.

The apparatus operates in a similar manner when the signal delivered from the converter 78 to the high speed detector 10 overbalances the external signal received at terminal 16. In this case the signal periodically delivered by the detector 10 to the discriminator 24 energizes the backward gate which sets the flip-flop 46 to its backward state. This results in the counting device 55 reducing its count by one unit count each time a signal is delivered from the blocking oscillator 64. The reduced count of the binary counting device 55 is reflected in the output signal of the converter 78 which changes its value in the direction to balance the externally received signal. The process of reducing the count of the counting device 55 takes place each time the detector 10 is energized by the detector driver 18 until the overbalance condition is replaced by the balanced state.

By comparing the signal derived from the converter 78 with an external analogue signal which may be continuously varying, the binary counter may have its count periodically increased or decreased to correspond with the received signal. The binary counting device 55 thereby provides at its output terminals 70, 72 and 74 a digital code which is a translation of the analogue information received at the input terminal 16. This digital code information is constantly available so that it can be taken at random times without synchronization and is periodically corrected at a high rate (100,000 times per second) to correspond with the input analogue signal.

The information translating apparatus takes advantage of the last translated information stored in the binary counting device 55 by changing its count to account only for changes in the information being translated. The efficiency and accuracy of operation of the apparatus is accomplished by this method since it is only necessary to change the count of the counting device 55 by increasing or decreasing it to correspond with the newly received information. If the received information is continuously varying then the change in the count will correspond to the change in the received analogue information, rather than a change from zero value to the translation value. It is evident that the counting device 55 is accurately corrected and follows any change in the incoming signal which does not exceed the rate of one count for each periodic sampling of the incoming signal. It is noted that the illustrated apparatus uses a sampling or comparing frequency of 100 kilocycles. Of course, this period may be adjusted for the particular requirements of the apparatus being designed. The number of significant digits of the binary counter 55 may be increased, thereby increasing the accuracy of the translated infomation, by adding stages to the counting device 55. The number of significant places translated, the sampling or comparing frequency, and the rate at which the device can follow and accurately translate the incoming analogue signals are all related and affect one another in the design of the equipment.

The apparatus may be used for determining the maximum or minimum values attained by a constantly varying analogue signal which is delivered to the input terminal 16, in the following manner. To determine the maximum value attained by the varying analogue signal, a permissive signal is delivered only to the control terminal 40 of the forward gate 32. The backward gate 34 is thus inhibited, and the forward gate will pass signals allowing the binary counting device 55 to increase its count when the output signal from the converter underbalances the externally derived signal on terminal 16. Since the count of the counting device 55 cannot be reduced it will show in digital form, the greatest value attained by the varying signal over a given period of time. Of course, the digital counter 55 should be initially set at zero value or at a value below the peak attained by the varying signal.

In a similar manner, for the determination of the lowest or minimum value attained over a given period of time by the varying signal delivered to the input terminal 16, a permissive signal is delivered only to the control terminal of the backward gate 34, while the forward gate 32 is inhibited by the lack of such a signal. In this case, only the backward gate 34 passes signals from the discriminator 24 causing the counting device 55 to indicate the lowest value attained by the varying signal. This is so since the counting device 55 cannot receive signals for counting in the forward direction. The count of the binary counting device 55 must be initially set at a value greater than the minimum value which is attained by the varying external signal for proper operation.

The information translating apparatus has been demonstrated thus far for converting analogue information received at its input terminal 16 to digitally coded information delivered at the output lines 70, 72, 74 of the counting device 55. by removing the connecting plug 80, the apparatus may now, conversely, receive digitally coded information over the series of input leads 76 of the converter 78 and delivers an analogue signal corresponding therewith over its output line 82. This conversion is achieved by utilizing the converter 78 already present in the apparatus and without the use of additional equipment. The apparatus thus provides in one unit, means for converting varying analogue information to digital form, and is adjustable for converting varying external digital information to corresponding analogue form. This feature, increases the versatility and usefulness of the apparatus.

*Signal comparing and discriminator circuits*

Refer now to FIGURE 2 which shows in schematic form the signal comparing and discriminator circuits of the information translating apparatus.

The detector 10 comprises a signal comparing network 100 and a diode bridge detecting circuit 101.

The signal comparing network 100 has series resistors 102 and 103 which are bridged between the signal input terminals 16 and 104. The signal input terminal 16 in this case is adapted for receiving externally derived analogue signals such as, for example, a voltage or current signal which may vary in amplitude as a function of time.

The input terminal 104 receives similar signals which are derived internally from the information translating apparatus and may be in the form of a voltage or current or other such signals which may be a function of time.

The junction point of the resistors 102 and 103 is connected with an output line 106 of the signal comparing network 100.

The detecting circuit 101 comprises an input-output lead 108 connected with the output lead 106 of comparing network 101, a reference potential lead 110 returned to ground potential, and a pair of control terminals 112 and 114. A pair of diodes 116 and 118 have their anodes joined with the control terminal 112 and their cathodes respectively connected with the input-output lead 108 and the reference potential lead 110. A second pair of diodes 120 and 122 have their cathodes connected with the control terminal 114 and their anodes respectively joined with the input-output lead 108 and the potential reference lead 110. The diode 118 is shunted by a resistor 124, while the diode 122 is shunted by a resistor 126 for the purpose of reducing the capacitive effect and increasing the efficiency of operation of the diode bridge detecting circuit 101.

The control terminal 112 is connected through a load resistor 128 with the cathode of a diode valve 130, while the control terminal 114 is connected through a load resistor 132 with the anode of a second diode valve 134. The anode of valve 130 is joined to one end of the secondary winding of a signal transformer 136 while the cathode of the diode valve 134 is joined to the other end of the secondary winding. The secondary winding of the transformer 136 is bridged by an adjustable center tap resistor 138 which has its center tap returned to ground potential.

*Detector driver and oscillator circuits*

The detector driver 18 energizes the primary winding of the transformer 136 responsive to an input signal derived from the oscillator 20. The secondary winding of transformer 136 is connected for signal inversion.

The oscillator 20 includes a triode valve 140 which has its anode returned to a negative potential of 195 volts through a parallel connected resistor-inductor combination 142, while its control electrode is returned to the anode by a grid resistor 144 in series with an inductor 146 and capacitor 148. The control element of valve 140 is also connected with a negative potential of 195 volts by the grid resistor 144 and a series resistor 150, and with a negative potential of 400 volts through the resistor 144 in series with a parallel resistor-capacitor combination 152 and a series resistor 154. The cathode of valve 140 is directly linked with the negative potential of 400 volts.

The oscillator 20 developes a sine wave voltage signal at the anode of the valve 140 which is transmitted by the capacitor 148 and a grid resistor 158 to the control element of a clipping valve 156. The anode of valve 156 is returned through a series resistor 160 and inductor 162 to the negative potential of 195 volts, while its cathode is directly linked with the negative potential of 400 volts.

The clipper valve 156 is driven by the oscillator signal which may have a frequency of 100 kilocycles and operates to produce a substantially square wave signal at its anode. The square wave signal at the anode of valve 156 is delivered by a capacitor 164 to the control electrode of the valve 166 of the detector driver 18.

The control electrode of valve 166 is returned to a negative potential of 400 volts by the grid resistor 168 and an input load resistor 170. The resistor 170 is bridged by a diode 172 which has its cathode joined to the negative potential of 400 volts. The cathode of valve 166 is returned through a cathode resistor 174 to the negative potential of 400 volts, while its anode is connected with the negative potential of 195 volts through the primary winding of the transformer 136. The effect of the diode 172 is to limit the positive excursion of the signal delivered to the control electrode of the valve 166.

*Operation of the oscillator and detector circuits*

In operation, the square wave signals delivered to the valve 166 causes it to develop similar signals in its anode circuit for energizing the primary winding of the transformer 136.

The signal delivered to the secondary of the pulse transformer 136 is balanced above and below ground by adjustment of the center tap of the load resistor 138.

When the secondary winding of the pulse transformer 136 delivers a signal to the anode of diode valve 130 which is positive with respect to ground, and a signal which is negative with respect to ground is delivered to the cathode of diode 138, these valves become conductive. When this occurs, a positive signal with respect to ground is delivered to the control terminal 112 and a negative signal with respect to ground is delivered to the control terminal 114. This results in the conduction of the four bridge diodes 116, 118, 120 and 122. Under these circumstances the input-output line 108 of the bridge circuit 101 is maintained at the same potential as the potential reference lead 110 which is at ground level.

When the transformer delivers a voltage to the anode of valve 130 which is negative with respect to ground and a voltage to the cathode which is positive with respect to ground, these valves become non-conducting. At this time, the input-output line 108 is no longer maintained at ground potential, and attains a potential depending upon the values of the respective signals received by the input terminals 16 and 104 of the balancing network 100.

Thus, for example, when a positive potential signal is delivered to the input terminal 16 and a corresponding negative potential signal is delivered to the input terminal 104 which balances the signal delivered to the terminal 16, then the signal upon its output lead 106 which is joined with the input-output lead 108 remains at ground potential. However, if the signal delivered to the input terminal 104 is not sufficiently negative, so that it underbalances the positive signal delivered to the terminal 16, then the output signal on lines 106 and 108 will be positive with respect to ground. Conversely, if the signal delivered to the input terminal 104 is more negative than required and overbalances the positive signal voltage delivered to the input terminal 16, then a negative potential signal with respect to ground will be delivered to the output line 106 and input-output line 108.

When the valves 130 and 134 become conductive again, the signal developed on the input-output line 108 is quickly returned to ground potential. In fact, it is possible to return the developed signal to ground potential at a faster rate than it takes for the signal to be developed after the valves 130 and 134 become non-conductive and the line 108 is not clamped at ground potential.

Thus the effect of the periodic conduction and nonconduction of valves 130, 134 is to periodically produce output signals which are related to the respective values of the input signals at the terminals 16 and 104. These output signals are periodically returned to the ground or reference potential. The sampling and comparison of the input signals which are concurrently received at the input terminals takes place at the oscillator frequency, in this case 100,000 times each second.

It is noted that a positive-going error pulse is produced by the detector 10 when the signal delivered to the input terminal 104 underbalances a positive signal delivered to the input terminal 16, whereas a negative-going error signal is produced having an amplitude determined by the degree of overbalance.

*Amplifier circuit*

The control electrode of valve 176 of amplifier 22 receives the pulse signals developed at the input-output line 108 of the detector 10 through a grid resistor 178. The valve 176 is normally conducting and has its anode returned to a positive potential of 150 volts through a series resistor 180 and inductor 182. The screen electrode is directly returned to the positive potential of 150 volts, while the suppressor electrode is linked to the cathode of valve 176 and is returned through a cathode resistor 184 to ground potential.

The tube 176 amplifies the signal received and produces an inverted signal at its anode. This anode signal is transmitted to the control electrode of the amplifier valve 190 by charging capacitor 186 in series with a grid resistor 188. The capacitor 186 may be 200 micro-microfarads while a resistor 192 may have a value of 100,000 ohms. The capacitor 186 has its junction with the grid resistor 188 returned to ground potential through the load resistor 192.

The anode of valve 190 is returned to the positive potential of 150 volts through a series resistor 194 and inductor 196, while its screen electrode is directly returned to this potential. The suppressor electrode is joined to the cathode of valve 190 which is linked to ground by a cathode resistor 198. The cathode of valve 190 is joined to the cathode of valve 196 by a positive feed-back resistor 200 which may be utilized to increase the gain of the amplifier 22.

In operation, the amplifier serves to produce an output signal comprising two pulse signals due to the charging and discharging of capacitor 186 responsive to the square wave input signal received from the detector 10. Thus, if a positive pulse is received from the detector 10 which corresponds to an underbalanced condition of the input signal at terminal 104 with respect to the signal at terminal 16, the amplifier 22 will develop an output signal at the anode of valve 190 which has a positive-going pulse corresponding to the leading edge of the input wave and a negative-going pulse corresponding to the trailing edge of the wave. Since the rise time of the pulse is greater than the fall time for its trailing edge, the negative-going pulse will have a greater amplitude than the amplitude of its preceeding positive-going pulse developed by capacitor 186.

*Discriminator circuit*

The pulse signals developed at the anode of valve 190 are delivered by a coupling capacitor 202 and grid resistor 204 to the control electrode of a normally conducting valve 206. The junction of the capacitor 202 and resistor 204 is returned to a negative potential of 400 volts through series resistors 208 and 212, while the cathode of valve 206 is returned to this potential through the series resistors 210 and 212. The anode of valve 206 is returned to the negative potential of 195 volts by a resistor 214 and develops an amplified inverted signal at its anode which is delivered through a coupling capacitor 216 to the input-output line 28 of a diode detector unit 220 of the discriminator 24.

The detector unit 220 is also provided with a reference potential lead 222 which is maintained at a negative potential of 420 volts, and a pair of control terminals 224 and 226. A pair of diodes 228, 230 have their anodes connected with the control terminal 224 and their cathodes respectively joined with the input-output lead 28 and the reference potential lead 222. The second pair of diodes 232 and 234 have their cathodes joined to the control terminal 226 and their anodes respectively connected with the input-output lead 28 and the potential reference lead 222.

A second signal is derived from the junction of the cathode resistors 210 and 212 of the valve 206 and is directly related to the input signal of the valve 206. This signal is transmitted through a coupling capacitor 242 to the input-output lead 30 of a second detector unit 244 of the discriminator 24.

The detector unit 244 is also provided with a reference potential lead 246 which is maintained at the negative potential of 420 volts, and a pair of control terminals 248 and 250. A pair of diodes 252, 254 have their anodes joined to the control terminal 248 and their cathodes respectively connected to the input-output lead 30 and the reference potential lead 246. A second pair of diodes 256, 258 have their cathodes joined to the control terminal 250 and their anodes respectively connected with the input-output lead 30 and the reference potential lead 246.

The control terminals 224 and 226 of the detector unit 220 are respectively joined through load resistors 236 and 238 with the ends 237 and 239 of the secondary winding of a pulse transformer 240, while the terminals 248, 250 of the detector unit 244 are respectively joined through load resistors 260, 262 with said winding.

The center tap of the secondary or output winding of the transformer 240 is returned to a negative potential of 420 volts and its ends 237, 239 are bridged by a resistor 276 in series with a diode 278. The diode 278 has its cathode joined with the end 237 of the secondary winding of the transformer 240.

*Discriminator driver circuit*

The discriminator driver 26 is provided with a valve 264 which has its anode returned to a negative potential of 195 volts through the primary winding of transformer 240. The control electrode of valve 264 derives a square wave signal from the anode of clipper valve 256 through a coupling capacitor 266 and resistor 268. The junction of capacitor 266 and resistor 268 is returned by an input resistor 270 to a negative potential of 400 volts. The resistor 270 is bridged by a diode 272 which has its cathode joined to the negative potential of 400 volts.

*Operation of discriminator and discriminator driver circuits*

In operation, the square wave signal delivered to the control electrode of the valve 264 produces alternately positive and negative voltage excursions across the ends 237, 239 of the output winding of the transformer 240. The diode 272 limits the positive excursion of the signal delivered to the control electrode of valve 264 thereby increasing the effectiveness of the pulse signals delivered. The resistor 276 and diode 278 balance the load on the transformer 240 and shape the signals which are developed.

When the signal at the output of the transformer 240 makes its end 237 positive with respect to its end 239, the control terminal 224 is positive with respect to the control terminal 226 of the detector unit 220. This results in the conduction of the diodes 228, 230, 232 and 234 producing an output voltage level on the input-output line 28 which is the same as the reference potential on line 222 (−420 volts).

When the energizing signal derived from the transformer 240 is reversed so that the control terminal 224 is negative with respect to the control terminal 226, this condition does not apply, the signals produced at the input-output lead 28 being determined by the pulse signals developed at the anode of the valve 206.

Since the second detector unit 244 is similar to the detector unit 220 and is connected in parallel to receive energization from the output winding of the transformer 240, it operates in a like manner. Thus when its control terminal 248 is positive with respect to the control terminal 250, the bridge diodes 252, 254, 256 and 258 are conductive thereby maintaining its input-output lead 30 at the reference potential on the lead 246. When this condition is reversed and the control terminal 248 is negative with respect to the control terminal 250, the input-output lead 30 will deliver a pulse signal derived from the cathode circuit of the valve 206. This signal will be inverted with relation to the signal at the input-output line 28.

It is important to note the phase relationship of the signals derived from the valve 206 and the energizing signals delivered to the detector units 220, 224 by the transformer 240. The voltage signal delivered across the control terminals 112, 114 of the detector circuit 101 is 180 degrees out of phase with the signals delivered across the control terminals 224 and 226 of the detector unit 220 and the control terminals 248 and 250 of the detector unit 244. This causes the units 220 and 224 to be conductive when the leading pulse signal is delivered and non-conductive when the trailing pulse signal is delivered by the valve 206.

The phase relationship is such that the bridge diodes of detector circuit 101 are non-conductive at the time when the bridge diodes of the detector units 220 and 224 are conductive. This means that the input-output leads 28 and 30 of the detectors 220 and 224 are maintained at the reference potential and do not deliver the leading pulse signals developed in the anode circuit of valve 206.

However, when bridge diodes of the detector circuit 101 become conductive, the bridge diodes of detector units 220 and 244 are non-conducting. Thereby the pulse signal derived from the trailing edge of the signal developed by the detector circuit 101, is transmitted over the input-output lines 28 and 30 of the discriminator 24. For example, if a positive-going signal is developed when the bridge diodes of detector 101 are energized to their non-conductive states, a signal will be delivered by the input-output lines of the discriminator corresponding only to the pulse signal developed by the trailing edge of this signal.

Since the trailing edge of this signal, which is produced by the return to ground potential of the signal from the detector circuit 101, has a greater slope than that of its leading edge, a larger pulse signal is produced which is more representative of the amplitude of the output signal of the detector 101 achieving a high degree of accuracy.

Of course, it is also possible by using in phase excitation of the detector circuit 101 and detector units 220 and 240, to produce a signal on the input-output lines of the discriminator 28, 30 which is the pulse derived from the leading edge of the output signal of detector circuit 101.

Although the signals delivered by the leads 28, 30 of the discriminator 24 are similar, they are inverted, so that if the signal on line 28 is positive-going, the pulse developed on line 30 is negative-going.

*Delay and blocking oscillator circuits*

The square wave signal developed in the anode circuit of valve 166 of the detector driver 18 is also transmitted to the control element of a cathode follower valve 284 through a coupling capacitor 280 and a grid resistor 282. An input resistor 281 returns the junction of the capacitor 280 and resistor 282 to a negative potential of 400 volts, while a diode 283 is connected across resistor 281 and has its cathode joined with the negative potential of 400 volts. The anode of valve 284 is linked to a negative potential of 195 volts, while its cathode is returned through a cathode resistor 286 to a negative potential of 680 volts.

A resistor 288 delivers the signal developed in the cathode of valve 284 to the resistor 290 of the delay network 38. The output end of the delay resistor 290 is connected to a negative potential of 400 volts through the delay circuit capacitor 292.

The junction between resistors 288 and 290 is clamped by a diode 294 which has its cathode returned to a negative potential of 400 volts and by a diode 296 which has its anode returned to a negative voltage of 420 volts.

The signal developed at the output of the delay network 38 is delivered through the primary winding of a transformer 294 to the control element of the valve 296 of the blocking oscillator 36. The anode of the valve 296 is returned to a negative potential of 195 volts through the secondary or output winding of the transformer 294 which is connected for phase inversion while its cathode is returned through a cathode resistor 298 to a negative potential of 400 volts.

In operation, the input square wave signal to the cathode follower valve 284 develops a square wave signal in its anode circuit whch is delivered to the delay network 38. The signal presented to the delay network 38 can vary between the negative potentials of 400 volts and 420 volts as limited by the clamping diodes 294, 296. The signals delivered by the network 38 are delayed for 2 microseconds and excite the blocking oscillator valve 296 which delivers positive-going gating signals to the output line 300.

*Control circuits*

Refer now to FIGURE 3 which discloses the control circuits of the information translating apparatus. These circuits derive excitation from the comparing and discriminator circuits illustrated in FIGURE 2.

The signals on the input-output lead 28 of the discriminator 24 are delivered by a grid resistor 304 to the control electrode 306 of the valve 308 of the forward gate circuit 32, while the signals developed on the output line 300 are delivered by a grid resistor 309 to the control electrode 311. The anode of valve 308 is returned through a load resistor 310 to a negative potential of 195 volts, while its cathode is directly returned to a negative potential of 400 volts. The control electrode 312 of valve 308 is connected to a negative potential of 420 volts by a resistor 314 and is joined to the cathode through a bypass capacitor 316. The control electrode 312 of valve 308 is also connected with the terminal 40 of a control switch 342 by a resistor 318.

The terminal 40 of the switch 342 is joined with a movable arm 340, shown in its first position contacting a terminal 344, which is maintained at a negative potential of 325 volts by connection to the junction of resistors 352 and 354 which bridge the negative potentials of 400 volts and 195 volts.

When the control switch 342 is in its second position, the arm 340 contacts a terminal 346 which is also maintained at the negative potential of 325 volts. When the switch 342 is in its third position, the arm 340 contacts the terminal 348 which places it in the open position.

The input-output lead 30 of the discriminator 24 is connected to the control electrode of the backward gate valve 358 of the gate circuit 34 by a grid resistor 360. The control electrode 361 of valve 358 is linked with the output line 300 to derive signals from the blocking oscillator circuit 36 through a grid resistor 363. The anode of valve 358 is returned through a load resistor 362 to a negative potential of 195 volts, while its cathode is linked to a negative potential of 400 volts. The control electrode 364 of the valve 358 is joined to a negative potential of 420 volts through a resistor 365 and is bypassed to the cathode through a capacitor 366. The control electrode 364 is also returned by a resistor 368 to the terminal 42 of the control switch 342. The terminal 42 is linked to an arm 370 of switch 342 which is ganged with the arm 340.

When the control switch 342 is in its first position, the arm 370 contacts the terminal 372 which is maintained at the negative voltage of 325 volts, while in its second position the arm contacts the open terminal 374. When the switch 342 is in its third position, the arm 370 contacts the terminal 376 which is also maintained at the negative potential of 325 volts.

*Operation of control circuits*

To illustrate the operation of the forward and backward gating circuits 32 and 34 with the control switch 342 in its first position, the control electrodes 312 and 364 of the valves 308 and 358 are positive with respect to their cathodes, conditioning the valves for conduction. When a positive pulse is delivered over the input-output lead 28 to the control electrode 306 of the forward gate valve 308 and a positive-going timing signal is delivered to the control electrode 311 shortly thereafter, the valve 308 becomes conductive. With conduction of valve 308, a negative-going signal is produced at its anode.

At the same time, a negative-going impulse is delivered to the control electrode 356 of the backward gate valve 358 so that this valve does not become conductive when the positive-going timing signal is delivered to its control electrode 361.

When however, a positive signal is delivered over the output lead 30 and a negative-going signal is produced at the output lead 28 of the discriminator 24, the backward gate valve 358 becomes conductive when the timing signal is received from the line 300, while the forward gate valve 308 remains non-conductive.

The conduction of valve 358 likewise produces a negative-going signal at its anode.

The timing effect of the gating signal at line 300 is produced by the 2 microsecond delay effected by the delay network 38 causing the signal to arrive slightly after the signal delivered from the discriminator 24.

*Forward-backward flip-flop circuit*

The forward-backward flip-flop 46 is controlled by the forward gate 32 and the backward gate 34. The flip-flop 46 comprises a valve 386 having first and second sections, one of which is conductive while the other is non-conductive. The control electrode 394 of valve 386 is connected to the anode of a diode 396 which has its cathode coupled with the anode of the forward gate valve 308 by a capacitor 397. The cathode of diode 396 is also joined to the cathode 399 of flip-flop valve 386 by a resistor 398. The anode 388 of valve 386 is returned to a negative potential of 195 volts by a series resistor 390 and inductor 392.

The other section of the valve 386 has a control electrode 404 which is coupled with the anode 388 by a grid resistor 402 and a parallel capacitor-resistor combination 400.

The anode 406 is connected by a series resistor 408 and an inductor 410 to the negative potential of 195 volts, while its cathode 412 is joined to the cathode 399. The anode 406 is also linked by a parallel capacitor-resistor combination 418 with the control electrode 394 of the valve 386.

The control electrode 404 of valve 386 derives excitation from the anode of the backward gate valve 358 by the series connection of its grid resistor 408 with a diode 414 and capacitor 415. The diode 414 is poled to deliver negative impulses to the control electrode 404. The cathode of diode 414 is also joined by a resistor 416 with the cathodes 399, 412 of the flip-flop valve 386. The cathodes of the valve 386 in turn are linked with a negative potential of 400 volts through a resistor 422 in series with a parallel resistor-capacitor combination 424.

The flip-flop valve 386 is shown with its first section conductive and its second section non-conductive. This represents its backward control state. When a negative signal is developed by the forward control valve 308 at its anode it is transmitted to the control elctrode 394 rendering this section non-conductive and causing the second section to become conductive. This places the flip-flop circuit 46 in its forward control state. The flip-flop circuit 46 will retain this state until a negative signal is developed at the anode of the backward gate valve 358. At this time a negative signal will be transmitted to the control electrode 404 of the flip-flop valve 386 rendering this section non-conductive and switching the valve 386 back to its backward control condition.

The signal developed on the anode 406 of valve 386 is delivered to the control electrode 426 of the valve 428 of the forward cathode follower 52 by a resistor 430 and grid resistor 432. The control elctrode 436 is also returned to a negative potential of 400 volts through the grid resistor 432 and a resistor 434. The anode of valve 428 is joined to a negative potential of 195 volts, while its cathode is linked to the negative potential of 400 volts through a cathode resistor 436 which is by-passed by a capacitor 438. The forward control line 54 is connected to the cathode of the valve 428 of the forward cathode follower 52.

The voltage on the forward control line 54 is not permitted to become more negative than the negative potential of 300 volts by a clamping diode 470 which has its anode joined to the cathode of a normally conducting voltage control valve 472.

The cathode of valve 472 is returned to a negative potential of 400 volts through a cathode resistor 473 which is by-passed by a capacitor 474. The voltage delivered to the control electrode of valve 472 is derived through a grid resistor 468 from the junction of a pair of divider resistors 452 and 454 which are connected between the negative potentials of 195 volts and 400 volts. The resistor 454 is by-passed by capacitor 456.

The valve 472 develops a negative potential of 300 volts at its cathode which is supplied to its output line 481 which is used for supplying the counting device 55. This voltage acting through the diode 470 does not allow the potential of the cathode of the valve 428 to become more negative than the negative potential of 300 volts.

*Cathode follower circuits*

Thus when the flip-flop 46 is in its forward condition, the signal at the anode 406 of the valve 386, which is at its negative excursion, is delivered to the cathode follower circuit 52. This results in a negative signal of 300 volts being delivered to the output line 54 of the valve 428. The signal on line 54 is delivered to the forward control terminals F of the reversible binary counting device 55.

When the flip-flop 46 is in its backward condition the valve 38 has switched the conduction of its sections so that the signal developed at the anode 406 is at its positive excursion level. This results in the delivery of a signal by the forward control line 54 which is more positive than the negative potential of 300 volts.

The backward cathode follower circuit 58 has the control electrode 480 of its normally conducting valve 482 coupled with the anode 388 of flip-flop valve 386 through a series resistor 484 and a grid resistor 486. The control element 480 is also returned to a negative potential of 400 volts by the grid resistor 486 and series resistor 488. The anode of valve 482 is joined to a negative potential of 195 volts, while its cathode is connected to a negative potential of 400 volts through a parallel capacitor-resistor combination 490. The backward control line 60 is joined to the cathode of valve 482 and is connected to the cathode of a clamping diode 492 which has its anode joined to the negative potential source of 300 volts at the cathode of the voltage control valve 472.

The clamping diode 492 serves to prevent the potential of the backward control line 60 from becoming more negative than the clamping voltage of minus 300 volts.

When the flip-flop circuit 46 is in its forward condition, the signal delivered to the control electrode 480 of valve 482 is positive with respect to the clamping potential of minus 300 volts, resulting in a positive voltage excursion of the signal delivered to the backward control line 60. However, when the flip-flop circuit 46 is in its backward state, a more negative signal is delivered to the control electrode 480 so that the voltage on the backward control line 60 is maintained at its clamping level of minus 300 volts. The signals developed at the backward control line 60 are delivered to the terminal B of the reversible binary counting device 55.

It is noted that since the forward and backward cathode followers 52 and 58 derive signals from different anodes of the valve 386 of flip-flop circuit 46, the signal level on line 54 will be negative with respect to the signal on the backward control line 60 when flip-flop 46 is in its forward state, and positive with respect thereto when flip-flop circuit 46 is in its backward state.

*Buffer circuit*

The anode of the forward gate valve 308 is connected to the cathode of a diode 494 of the buffer 62, while the anode of valve 358 of the backward gate 34 is joined to the cathode of a diode 496 of the buffer 62. The diodes 494 and 496 have their anodes connected together and connected to the end of an input winding of a transformer 498; the other end of the input winding of the transformer 498 is connected to the junction of resistors 500 and 502 which are connected between negative potentials of 195 volts and 400 volts. The input winding of the transformer 498 is shunted by a load resistor 504, while the divider resistor 502 is by-passed by a capacitor 506. The output winding of transformer 498 is shunted by a resistor 508 and is connected for phase inversion, delivering a signal to the control element 510 of a double section valve 512 of the blocking oscillator circuit 64.

*Blocking oscillator circuit*

The anodes of valve 512 are connected together and are returned to a negative potential of 195 volts through the winding 516 of a pulse transformer (having a second winding 518) and a load resistor 520. The junction of the winding 516 and resistor 520 is connected to a blocking oscillator output line 522. The transformer winding 518 is connected for phase inversion with respect to the winding 516 and connects the grid 524 of valve 512 through a resistor 526 with a negative potential of 420 volts. The cathodes 528 and 530 of the valve 512 are respectively joined by resistors 532 and 534 with the second end of the output winding of transformer 498, the resistor 532 being by-passed by a capacitor 536. The signal developed at the cathode 530 of the blocking oscillator valve 512 is coupled by a capacitor 538 with the count pulse output terminal 86.

When negative output signals are developed by the forward and backward gate circuits 32 and 34, they pass through the buffer 62 and energize the primary or input winding of the transformer 498. The pulse transformer 498 inverts the signals and delivers positive-going pulses to the blocking oscillator valve 512. This results in a negative-going signal at the output line 522, while a similar positive-going signal is delivered to the count pulse output terminal 86 for controling and synchronizing or actuating auxiliary and supplemental equipment.

A particular characteristic of the blocking oscillator 64 is that it will not develop an output pulse unless the amplitude of the signal delivered to its control electrode exceeds a predetermined threshold value. The threshold value is exceeded when the signal received by the control element 510 of the blocking oscillator valve 512 is of sufficient positive amplitude to cause the transformer windings 516, 518 to produce a voltage at the control element 524 positively exceeding its cut-off value. This causes conduction of the right section of the valve 512 allowing the blocking oscillator to generate an output pulse signal. After producing its output pulse signal, the oscillator circuit is again biased to cut-off and responsive to an actuating pulse of sufficient positive amplitude at the control element 510. The importance of this function has already been explained in connection with the description of FIGURE 1.

*Binary counting device circuit*

Refer now to FIGURE 4 for a description of the storage or binary counting device 55.

The signals produced on the forward control line 54 are delivered to the terminals F of the ten cascade bistable or flip-flop circuits 540 of the reversible counting device 55, while the signals on the backward control line 60 are delivered to the terminals B.

The negative-going pulse signals from the blocking oscillator 64 are delivered over the line 522 to the input capacitor 542 of the first bistable circuit 540 through the inductor-capacitor delay element 66 which has a terminating resistor 544 returned to a negative potential of 195 volts.

The coupling capacitor 542 delivers the signals to the control element 546 of the double section valve 548 through a diode 550 in series with resistors 552 and 554. The diode 550 is poled to transmit negative signals to the valve 548. The control electrode 546 is also returned to a negative potential of 400 volts through the grid resistor 554 in series with a resistor 556. The cathode 558 is joined with a negative potential of 400 volts by a cathode resistor 559, while the anode 560 is linked with a negative potential of 195 volts through the primary winding of a pulse transformer 562 and a load resistor 563.

The valve 548 which has one of its sections conductive while its other section is non-conductive, receives excitation at its control electrode 564 from the coupling capacitor 542 through a grid resistor 566 in series with a resistor 568 and a diode 570 poled for passing negative signals. The control electrode 564 is also returned to a negative potential of 400 volts by the grid resistor 566 in series with a resistor 572, while its cathode 574 is joined to the negative potential of 400 volts by a cathode resistor 576 in series with a parallel resistor-capacitor combination 578. The anode 580 of valve 548 is returned to a negative potential of 195 volts by the primary winding of a pulse transformer 582 and a series load resistor 584. The control electrode 564 of valve 548 is also cross-coupled by the grid resistor 566 and the parallel resistor-capacitor combination 586 with the junction of the primary winding of the transformer 562 and the load resistor 563 in the circuit of anode 560, while the control electrode 546 is cross-coupled by the grid resistor 554 and the parallel resistor-capacitor combination 588 with the junction of the primary winding of the transformer 582 and the load resistor 584 in the circuit of the anode 580.

The secondary winding of the transformer 562 has one end connected to the terminal F for receiving control signals from the forward control line 54 and its other end connected to the cathode of a diode 690 which has its anode returned to a negative potential of 300 volts through an output resistor 694 and is coupled to the following bistable circuit 540 by its input capacitor 542.

The secondary winding of transformer 582 has one end connected to the terminal B for receiving control signals from the backward control line 60 and its other end connected to the cathode of a diode 692 which has its anode joined to the anode of the diode 690.

The cascade bistable or flip-flop circuits 540 each represents a significant position in a binary coded number, the preceding bistable circuits 540 having a lesser significance than the succeeding circuit 540. Thus, the first bistable circuit 540 which receives the input count signal may be represented by $2^0$, while the following bistable or flip-flop circuit 540 is represented by $2^1$, and the third by $2^2$ and so forth. Each of the bistable circuits 540 is identical to any other circuit 540 in construction and operation. The description of the construction and operation of one unit 540 therefore, may be considered to apply to the remaining units 540.

The digital code output line 70 derives its excitation by connecting in the anode circuit of the valve 548 at the junction between the primary winding of the transformer 582 and load resistor 584, while the output line 72 is connected to the junction between the primary winding of transformer 562 and load resistor 563. Since these leads are connected to the respective anodes of valve 548, only one of which is conducting, bipolar signals are respectively derived. Signals are delivered to the converter exciting line 74 by connection with the anode 580 of the valve 548.

As illustrated in the drawing when the right section of the valve 548 is conductive, the output signals delivered to the line 70, 72 and 74 represent the "one" state of the bistable circuit 540, whereas when the left side of the valve 548 conducts, the signals derived represent the "zero" state of the circuit. When a negative signal is delivered through the input capacitor 542 of the bistable or flip-flop circuit 640, conduction is transferred from the conducting side of the valve to the non-conducting portion. Thus if the circuit 540 is initially set in its "zero" state, it is actuated to its "one" state, whereas if it is in its "one" state it is returned to its "zero" state.

The initiation of conduction when the circuit is changed from one state to another produces a negative-going pulse in the secondary winding of the transformer associated with the anode which becomes conductive. For the purposes of illustration, assume that the forward-backward flip-flop 46 is in its forward state so that a forward control line 54 delivers a negative voltage of 300 volts to the F terminal, while the backward control line 60 delivers a signal more positive than this to the B terminal of the circuit 540. Thus when the valve 548 assumes its "zero" state a negative signal is produced and delivered through the capacitor 542 to the succeeding flip-flop circuit 540. When the circuit 540 is actuated to its "one" state, excitation of its transformer 582 produces a negative signal in its secondary winding which however, is positively biased and therefore does not transmit a signal through the coupling capacitor to the succeeding binary stage or bistable circuit 540. This selective biasing of the secondary windings of the transformers 562 and 582 causes the binary counting circuit 55 to count in the forward direction. When the bias voltages applied to the terminals F and B of the circuit 540 are reversed, as when the forward-backward flip-flop circuit 46 is in its backward state, a carry pulse to the succeeding stage will be transmitted only when the valve 548 assumes its "one" state of conduction. This results in a binary counting circuit which subtracts from the stored value by one count for each input signal received.

It is therefore noted that by selecting the forward and backward control signals, the counting device 55 is fully reversible and may be made to count in the backward and forward directions.

The delay element 66 which produces a delay of 2 microseconds is provided to allow sufficient time for the bistable circuits 540 to receive the proper biasing signals at their terminals F and B for the selected forward or backward counting action. It is noted that this switching however may be accomplished at a very high rate.

The cascade bistable circuits 540 of the counting device 55 may have interposed after the fifth bistable circuit as illustrated in FIGURE 4, a pulse amplifying and shaping network which receives signals through a coupling capacitor 702. The coupling capacitor 702 passes negative signals through a diode 704 which is series connected with a grid resistor 706 that is joined with the control electrode 709 of a normally conducting amplifier valve 710. The cathode of the diode 704 which is joined to the capacitor 702 is returned to the negative potential of 195 volts by a resistor 712 and is connected with a negative potential source of 400 volts by a resistor 714. The cathode of diode 704 is also joined by a resistor 716 with the cathode of valve 710. The cathode of valve 710 is returned to a negative potential of 400 volts through a cathode resistor 718 which is by-passed by a capacitor 720. The anode of valve 710 is returned to the negative potential of 195 volts through the primary winding of a transformer 722.

The secondary winding of the transformer 722 has one end returned to a negative potential of 300 volts while its other end delivers a signal to the sixth cascade bistable circuit 540. The ends of the secondary winding of the transformer 722 are also bridged by a diode 724 and a load resistor 726 for quick recovery from positive pulse signals.

In operation, a negative signal is delivered to the control electrode of the normally conducting valve 710 causing it to become non-conducting. This produces a negative-going signal at the output winding of the transformer 722 which is of proper amplitude for effectively triggering the succeeding ($2^5$) flip-flop circuit 540.

The tenth in the series of flip-flop circuits 540 may be utilized to indicate the sign of the count of the counting device 55 when it is to include negative numbers as well as positive numbers. In such a case, the tenth circuit indicates that the number of the count is negative when it is in the "zero" state, while producing a positive number when it is in its "one" state.

The flip-flop circuit 730 which follows the tenth flip-flop circuit 540, is similar thereto except that it is not provided with pulse transformers in its anode circuits, and has its anode 732 joined by a resistor 734 to a neon bulb 736 which connects with the junction between resistors 738 and 740 bridging the negative potentials of 195 volts and 400 volts. The valve 733 of flip-flop 730 normally has its left section conductive so that its anode 732 is maintained at a reduced voltage preventing conduction of the neon bulb 736.

When a negative-going signal is received from the preceding bistable circuit 540 indicating an overflow condition, conduction is switched so that the anode 732 becomes more positive and allows the neon bulb 736 to conduct for indicating the overflow condition.

The flip-flop valve 733 may be reset by opening the switch 742 which delivers a positive signal to the control electrode associated with the anode 732 causing it to become conductive and in condition for again indicating an overflow condition.

*Digital to voltage converter circuit*

Refer now to the FIGURE 5 for a description of the digital to voltage converter 78.

The connecting plug 80 shown in FIGURE 1 may be used to join the converter output leads 74 of the cascade bistable stages 540 of the counting device 55 with the series of respective input leads 76 of the converter 78. Each of the input leads 76 connects with an identical current control network 750 which corresponds with the several flip-flop circuits 540 of differing digital significance. The description of one of the networks 750, therefore, will apply to the remaining nine current control networks 750.

The signal input lead 76 is connected by a grid resistor 751 to the control element 752 of a two section switching valve 754. The cathode 756 of valve 754 is linked to the anode of a normally conducting current control valve 758 which has its cathode returned by a cathode resistor 760 to a negative potential of 680 volts. The control electrode of valve 758 is connected through a grid resistor 762 to a negative potential of 350 volts developed at the junction of a pair of divider resistors 764 and 766 bridged between ground potential and the negative potential of 680 volts. The divider resistor 766 is by-passed by a capacitor 768.

The anode associated with the control electrode 752 of the current switching valve 754 is returned by a load resistor 770 to the ground potential level and is by-passed by a capacitor 772. This anode is also joined by a resistor 774 with a neon bulb 776 which has its other side connected to the junction of a pair of voltage dividing resistors 778 and 780 bridging a negative potential of 195 volts and ground potential.

The cathode of the second section of valve 754 is also connected to the anode of the normally conducting current control valve 758, while its control electrode 784 is returned to a negative potential of 225 volts by a grid resistor 786. The anode 788 associated with the cathode 782 of the valve 754 is joined with the signal input line 790 of a signal converting network 792.

The signal converting network 792 comprises a series of signal input lines 790 each connected with the anode 788 of a respective one of the valves 754 of the current control networks 750. A plurality of series connected resistors 794 of resistance R are respectively connected between adjacent input signal lines 790, while their junctions are respectively returned to a positive potential of 50 volts by a plurality of parallel resistor 796 having a resistance of 2R. The end of the signal converting network 792 associated with the current control network 750 of the least significant position is connected to a positive potential of 50 volts by a resistor 798 having a resistance of R while the other end of the network is returned to the positive potential of 50 volts by a terminal or output resistor 800. The terminal or output resistor 800 has a resistance of $R_V$ which may be varied to equal or exceed R.

The resistors 794 should be quality controlled to have almost identical R values, while the resistors 796 should have substantially identical 2R values.

The junction of series resistor 794 and terminal resistor 800 is connected to the converter output signal line 82.

In the operation of converter 78, the current switching valve 754 of the current control network 750 has one of its sections conductive, while its other section is non-conductive. Thus, when the signal received over the input line 76 is derived from a bistable network 540 of the binary counting device 55 which is in its "zero" state, this signal is sufficiently positive to cause the right side of the valve 754 to conduct, while its other section is non-conductive. This places the current control network 750 in its "off" condition.

When the signal to the input line 76 is derived from a bistable circuit 540 which is in its "one" state, a sufficiently negative signal is delivered to the control electrode 752 to cause conduction to be transferred to the other section of the valve 754 placing the network 750 in its "on" condition. This allows current to flow through the input lead 790 of the signal converting network 792.

When the current control network 750 is in its "off" position, the voltage impressed across the neon bulb 776 is insufficient to ignite it and cause it to glow. However, when the circuit is switched to its "on" condition, the voltage of the non-conducting anode becomes sufficiently positive to ignite the neon bulb 778 and thereby visually indicates that the network 750 is in its "on" condition.

Although the voltage delivered to the anode 788 of the switching valve 754 may vary depending upon the number of current control circuits 750 are in their "on" and "off" conditions, this circuit allows the current drawn through the input lines 790 to remain substantially constant. This is achieved by valve 754 with the constant current control valve 758 and its cathode resistor 760 in the path of the current flow from lead 790. This arrangement is such that the change in current with change in voltage at the anode 788 of valve 754, is inversely related to the product of the amplification factors of valves 754 and 758. From this it is apparent that the greater the amplification factor the smaller will be the change in current with change of anode voltage. Also increasing the number of valves in the series path of the current through lead 790 by adding additional valves in the manner of those shown, will increase the number of amplification factors forming the product, thereby resulting in greater current stability.

Since current is constantly flowing through valves 754 and 758 when it is either in its "on" or "off" conditions, the circuit is set for switching to its other state without heating and drift variations. Of course the best results are obtained when the elements used are of high quality and uniformity. For example, it is especially important that the values of the cathode resistors of the several networks 750 have equal resistances for drawing equal currents from the network 792.

If the output voltage signal delivered on the output line 82 of the converter 78 is measured with respect to the positive voltage of 50 volts, a zero signal will be delivered when all of the current control networks 750 are in their "off" conditions. This is apparent from the fact that since no current flows in the network 792, the input line 82 remains at the positive potential level of 50 volts supplied to the network. When the network 750 which corresponds to the least significant position $2^0$ is placed in the "on" condition a voltage drop takes place in the network 792 producing a negative signal (with respect to plus 50 volts) representing a one unit count of the binary counting device 55. When the network 750 which corresponds to the second significant position is in its "on" condition, a negative signal is produced on the output line 82 which is two times the amplitude of the signal produced by the next preceding network 750 of lesser binary significance. Thus each succeeding network 750 produces a voltage change which is increased by a scale factor of two over its next preceding stage of lesser binary significance. The signal produced at the output line 82 is the sum of the effects produced by the circuits 750 individually. The signals delivered to the respective input lines or leads 790 of the network 792 are multiplied by their respective lead scale factors and added to produce the linearly related output signal on line 82.

The value of the terminal resistor 800 may be varied without changing the relationship of the effects of the several networks 750 on the output signal of the network 792. Thus a succeeding network 750 will produce a signal output at the line 82 which is twice the signal produced by its preceding network 750. The increase of the value of the resistor 800 over the resistance R will increase the value of the output signal at the output line 82 without any other changes in the circuit. The increase in the output signal on the output line 82 continues as the resistance of the resistor 800 is increased until it is infinite. The change in the resistance of the desistor 800 from R to an infinite value, results in an increase or amplification of the output signal on the line 82 by a factor of three. This increase of signal output amplitude is highly important since the other known ways of achieving this are accompanied by disadvantages in the circuit design and efficiency of operation.

Thus, when digital information is delivered to the input leads 76 of the converter 78, the current control networks 750 are respectively switched to their "on" and "off" conditions in accordance with the concurrently received input signals. The resulting flow of current through the input leads 790 of the signal converting network 792 associated with networks 750, which are in their "on" condition, produces an output signal at the output line 82. The amplitude of the output signal 82 is an analogue representation or translation of the digitally received information on the input leads 76 of the converter 78.

As the information received by the input leads 76 changes so does the output signal on the line 82 of the converter 78. It is noted that the switching operation of the valves 754 in the current control networks 750 may take place at great speed, so that the analogue information delivered at the line 82 corresponds closely with the digital information received on the input lines 76. Since the digital input information is constantly present and may be periodically altered, the output signal on the line 82 is always available and changes periodically to correspond with the input information.

The illustration of the several switching circuits 750 of converter 78 shows the set-up in FIGURE 5 of the digital signal information +01010111 which is being converted to analogue or voltage form and delivered to the output terminal 82.

The analogue voltage signal developed on the output line 82 of the converter 78 is delivered to the input terminal 104 of the signal comparing network 100 of detector 10 shown in FIGURE 2.

It is noted that by Thevenin's theorem, the signal converting network 792 of the converter 78 may be replaced by a voltage source equal to the open circuit voltage $V_T$ developed on the output line 82 in series with a resistor of value equal to the passive resistance of the network measured across the output resistor 800. In this case, the network 792 may be replaced by the source of voltage $V_T$ in series with a resistor $R_T$ having a resistance of two-thirds R. The resistance $R_T$ is effectively in series with the resistor 103 of the signal comparing network 100. If the total resistance of the resistors $R_T$ and 103 is equal to the value of the resistance of 102, then the comparing network 100 will be balanced by an open voltage signal $V_T$ on line 82 which is equal to the voltage of the signal delivered at the input terminal 16 but of opposite polarity. Under such balanced conditions, the output line 106 will be at zero or ground potential.

For example if a positive voltage (with respect to ground potential) of 40 volts is delivered to the input terminal 16, it will be balanced by a negative potential signal $V_T$ of 40 volts. However, if the negative open circuit voltage $V_T$ developed at line 82 is 50 volts it overbalances the network 100 and produces a negative output signal on line 106, while if the open circuit negative voltage $V_T$ at output line 82 is 30 volts it underbalances the network 100 and produces a positive output signal at the output line 106.

Of course, the network 108 may be arranged with its elements so that different conditions of balance will obtain and different relationships are established for balancing the compared signals.

It is also noted that although the signal comparing network 100 is illustrated for comparing the voltage amplitudes of signals, this invention is not limited thereto and may include current and impedance comparisons, as well as comparisons of frequency modulated and other kinds of signals.

*Summary*

Refer now to the FIGURES 2, 3, 4 and 5 for a description of the operation of the information translating apparatus in its entirety.

The input signals delivered to the terminals 16 and 104 are compared by the network 100 which delivers a positive or negative signal depending upon whether the internally derived signal underbalances or overbalances the externally derived signal on the terminal 16. The amplitude of this signal is directly related to the degree of unbalance.

The signal on the output line 106 corresponding to the compared input analogue signals is allowed to develop only when the diodes of the bridge detector circuit 101 are non-conducting. When the diodes become conducting the signal on the line 106 is reduced to ground potential.

If the compared signals are in balance no signal is delivered to the amplifier 22. However, if the signals are overbalanced or underbalanced, a signal is passed through the amplifier to the valve 206 which drives the inputs of the detector units 220 and 244.

The amplifier 22 also serves to produce pulse signals of the leading and trailing edges of the input square wave signal having amplitudes responsive to the amplitude of the square wave input signal. The detector units 220 and 244 of discriminator 24 are energized to pass the trailing pulse signal received from the amplifier 22.

If the signal balancing network 100 is underbalanced the detector unit 220 sends a positive gating signal over the lead 28 to the forward gate 32 which triggers the flip-flop 46 to its forward state. If the signal balancing network 100 is overbalanced, the detector unit 244 of discriminator 24 delivers a positive-going signal over its output lead 30 to the backward gate 34 which switches the flip-flop 46 to its backward state.

The forward and backward gates 32 and 34 are timed by a gating signal derived from the blocking oscillator 36 which receives delayed excitation derived in common with the detector 10 and the discriminator 24 from the oscillator 20 which in this case operates at a frequency of 100 kilocycles.

When the flip-flop 46 is in its forward state, the forward and backward cathode followers 52 and 58 develop output signals over their respective control lines 54, 60 which when delivered to the terminals F and B condition the flip-flop or bistable networks 540 so that the binary counting device 55 counts in the forward direction.

Conversely, when the flip-flop 46 is in the backward state, the signals delivered over the output control lines 54, 60 are such that the binary counting device 55 is conditioned to count in the backward direction.

The output signals from the forward and backward gates 32, 34 are delivered through the buffer 62 to the input of the blocking oscillator 64 which delivers an input count pulse to the binary counting device 55 if the amplitude of the input signal exceeds its threshold value. This signal increases or decreases the count of the counting device 55 depending upon whether the device 55 is conditioned for forward or backward operation.

The sets of output leads 70 and 72 of the counting device 55 deliver digital bipolar output signals representing the count of the counting device 55. This information is also transmitted by the output terminals 74 to the input terminals 76 of the converter 78 which provides the analogue or voltage excitation which is delivered to the input terminals 104 of the comparing network.

The operation of the information translating apparatus is such that an unbalanced condition at its comparing network 100 results in changing the stored count of the binary counting device 55 so that the signal delivered to the input terminal 104 is changed in the direction to balance the signal received at its terminal 16. In this manner, the count of the counting device 55 changes to follow the input signal at terminal 16 and thereby provides digitally coded output signals.

When it is desired to determine the maximum level attained by a varying input signal delivered to the input terminal 16, the control switch 342 (FIGURE 3) is set to its second position which allows the continued operation of the forward gate 32 but inhibits operation of the backward gate 34. Under such circumstances, the count of the device 55 may increase only and follows the externally derived signal when its value goes beyond that stored in the counting device 55.

On the other hand, when the lowest value attained by the externally derived varying signal at the input terminal 16 is to be ascertained, the control switch 342 is set to its third position. This inhibits operation of the forward control gate 32, but allows continued operation of the backward control gate 34. This permits the counter 55 to decrease its count only for indicating the lowest value achieved by the input information.

Of course, in either case the counting device 55 must be set initially so that its count is below the maximum value to be measured or above the minimum value to be determined.

The information translating apparatus may be adjusted for converting externally derived coded information to analogue form without additional equipment. This is accomplished by delivering the digital information to the respective series of information input leads 76 of the digital-to-voltage converter 78 which delivers the corresponding analogue information at its output line 82.

Although the information translating apparatus has been described and illustrated in specific form, the results may be achieved by other circuits and devices performing similar operation which are equivalent thereto and carry out the method of the invention. This invention of apparatus and method, therefore, is not specifically limited by the particular apparatus shown and described since there will be obvious to those skilled in the art many modifications and variations accomplishing the foregoing objects and realizing many or all of the advantages, but which yet do not depart essentially from the spirit of the invention.

What is claimed is:

1. Information translating apparatus comprising, a reversible counter having a plurality of bit stages each storing the binary value of a weighted digital number bit and arranged consecutively in the order of decreasing significance of the respective bits, a source of an input analog signal, means responsive to the count stored in said counter for developing a decoded analog signal characteristic of the weighted sum of the stored bit values, a source of timing pulses, means responsive to said timing pulses, said input analog signal and said decoded analog signal for periodically providing error signals indicative of which of said analog signals is larger, gating means responsive to said error signals and said timing pulses for delivering forward and backward signals when said input analog signal is respectively larger and smaller than said decoded analog signal, means for coupling said forward and backward signals to said reversible counter for conditioning said counter to respectively advance and retard said count to lessen the difference between said analog signals, and means responsive to forward and backward signals exceeding a predetermined magnitude for causing said counter to count a preset digital quantum.

2. Information translating apparatus comprising a reversible counter having a plurality of bit stages each storing the binary value of a weighted digital number bit and arranged consecutively in the order of decreasing significance of the respective bits, a source of an input analog signal, means responsive to the count stored in said counter for developing a decoded analog signal characteristic of the weighted sum of the stored bit values, a source of timing pulses, a high speed detector energized by said input and decoded analog signals and responsive to said timing pulses for periodically providing difference pulses characteristic of the sense of the difference between said analog signals, a discriminator responsive to said difference pulses and said timing pulses for providing forward and backward trains of error pulses when said input analog signal is respectively larger and smaller than said decoded analog signal, means responsive to said timing pulses for providing gated pulses which occur in time coincidence with said error pulses, forward and backward gates energized respectively by said forward and backward error pulses and jointly by said gated pulses, and means responsive to which of said gates passes said gated pulses for altering said count to lessen the difference between said analog signals.

3. Information translating apparatus for continually converting an input signal into digital form comprising: a reversible digital counter; a digital-to-voltage converter; disconnectable means coupling the output of said counter to the input of said converter whereby said converter may be readily uncoupled from said counter and connected to a different digital source; said converter in response to the output of said counter continuously converting the digital count of said counter to an analog signal; a comparator for comparing said input signal with said analog signal; means for intermittently providing an output from said comparator; a discriminator responsive to the intermittent output of said comparator for providing a first output when said analog signal exceeds said input signal and a second output when said input signal exceeds said analog signal; means connected between said counter and said discriminator and responsive to the output of said discriminator for causing said counter to be set in condition to count in the direction tending to lessen the difference between said analog and input signals; and means responsive to the output of said discriminator when it exceeds a predetermined magnitude for providing a signal to cause said counter to count a predetermined digital quantum after each intermittent output of said comparator.

4. Information translating apparatus for converting an input signal into digital form comprising: a reversible binary counter; a digital to analog converter connected to the output of the counter for continuously converting the binary count of the counter to an analog signal; a comparator for comparing the input signal with the analog signal; means for intermittently providing an output from the comparator; a bistable device controlling the direction in which the count in the counter is altered; first and second gates coupled to the bistable device; the first and second gates being coupled to the output of the comparator; a blocking oscillator having its input coupled to the outputs of the first and second gates, the blocking oscillator providing an output signal when its input is energized by a signal exceeding a predetermined value; and a delay element connecting the output of the blocking oscillator to the count input line of the counter.

5. Information translating apparatus for converting an input signal into digital form comprising: a reversible counter; a converter connected to the counter for continuously converting the digital count of the counter to an analog signal; a comparator for comparing the input signal with the analog signal; means for causing the comparator to intermittently compare the input and analog signals and provide an output signal indicative of the sense and the magnitude of the difference between the compared signals; a forward gate and a backward gate coupled to the output of the comparator; bistable means connected between the gates and the counter for causing the counter to be set in condition to count in the direction tending to lessen the difference between the analog and input signals; and means responsive to an output signal from either of the gates exceeding a predetermined magnitude for providing a signal causing the counter to count a preset digital quantum.

References Cited in the file of this patent

UNITED STATES PATENTS

| | | |
|---|---|---|
| 2,475,050 | Purington | July 5, 1949 |
| 2,497,961 | Shaw | Feb. 21, 1950 |
| 2,539,623 | Heising | Jan. 30, 1951 |
| 2,568,724 | Earp | Sept. 25, 1951 |
| 2,570,221 | Earp | Oct. 9, 1951 |
| 2,700,149 | Stone | Jan. 18, 1955 |
| 2,715,678 | Barney | Aug. 16, 1955 |
| 2,717,994 | Dickinson | Sept. 13, 1955 |
| 2,718,634 | Hansen | Sept. 20, 1955 |
| 2,722,654 | Sikorra | Nov. 1, 1955 |
| 2,638,504 | Gray | Mar. 13, 1956 |
| 2,760,064 | Bell | Aug. 21, 1956 |
| 2,784,396 | Kaiser | Mar. 5, 1957 |
| 2,787,418 | McKnight | Apr. 2, 1957 |
| 2,836,356 | Forrest | May 27, 1958 |
| 2,839,740 | Haanstra | June 17, 1958 |
| 2,872,670 | Dickinson | Feb. 3, 1959 |
| 2,931,024 | Slack | Mar. 29, 1960 |